(12) United States Patent
Ikehara et al.

(10) Patent No.: US 6,400,353 B1
(45) Date of Patent: Jun. 4, 2002

(54) POINTING DEVICE

(75) Inventors: Mitsuo Ikehara; Hironori Akama; Noriko Akama, all of Miyagi (JP)

(73) Assignee: Tsuken Electric Industrial Co., Ltd., Sendai (JP)

( * ) Notice: Subject to any disclaimer, the term of this patent is extended or adjusted under 35 U.S.C. 154(b) by 0 days.

(21) Appl. No.: 09/486,532

(22) PCT Filed: Aug. 26, 1998

(86) PCT No.: PCT/JP98/03818

§ 371 Date: Feb. 28, 2000

(87) PCT Pub. No.: WO99/14656

PCT Pub. Date: Mar. 25, 1999

(30) Foreign Application Priority Data

Sep. 18, 1997 (JP) ............................................. 9-253494

(51) Int. Cl.[7] ................................................. G09G 5/08
(52) U.S. Cl. ...................... 345/157; 345/161; 345/163; 345/166; 345/167; 345/169; 345/184; 200/5 R; 200/5 ER; 273/148 R; 463/36; 463/37; 463/47; 341/20; 341/23
(58) Field of Search ............................... 345/156–161, 345/163, 166, 167, 169, 184; 200/5 R, 5 ER, 211, 531, 547; 273/148 R; 463/36, 37, 47; 341/20, 23, 33, 34

(56) References Cited

U.S. PATENT DOCUMENTS

| | | | | |
|---|---|---|---|---|
| 4,816,810 A | * | 3/1989 | Moore .................... | 273/148 B |
| 5,305,181 A | * | 4/1994 | Schultz ........................ | 345/168 |
| 5,479,919 A | * | 1/1996 | Buchtal ................. | 128/200.24 |
| 5,488,362 A | * | 1/1996 | Ullman et al. .......... | 273/148 B |
| 5,489,922 A | * | 2/1996 | Zloof ........................ | 345/156 |
| 5,738,325 A | * | 4/1998 | Brown .................... | 248/205.3 |
| 5,764,164 A | * | 6/1998 | Cartabiano et al. ..... | 273/148 B |
| 5,779,211 A | * | 7/1998 | Bird ............................ | 224/222 |
| 5,832,296 A | * | 11/1998 | Wang et al. ........... | 340/825.52 |
| 5,896,125 A | * | 4/1999 | Niedzwiecki ............... | 345/156 |
| 6,030,290 A | * | 2/2000 | Powell .................. | 200/DIG. 2 |
| 6,097,369 A | * | 8/2000 | Wambach .................... | 345/157 |
| 6,304,840 B1 | * | 10/2001 | Vance et al. .................. | 341/20 |

FOREIGN PATENT DOCUMENTS

| | | |
|---|---|---|
| JP | 3-64432 | 6/1991 |
| JP | 3-93937 | 9/1991 |
| JP | 5-62932 | 8/1993 |
| JP | 6-7138 | 1/1994 |
| JP | 3030320 | 8/1996 |

* cited by examiner

*Primary Examiner*—Richard Hjerpe
*Assistant Examiner*—Henry N. Tran
(74) *Attorney, Agent, or Firm*—Jordan and Hamburg LLP (57) ABSTRACT

A pointing device which can be operated by a disabled person with a declined muscular strength, even when the person lies in a bed, to move a cursor and make a click separately not only by one hand but also by a body portion having a motor function with a light touch without any complex movement and large motion, and which does not need any operation area. The device comprises a flat cursor-moving switch for moving a cursor, a ring-shaped clicking switch for making a right click and a left click, a cloth sheet which is detachably attached to the rear of the cursor-moving switch if necessary and spread on the place where the cursor-moving switch is operated to enable the installation of the cursor-moving switch on a place other than a flat surface, a controller which measures the direction and distance of the movement of the cursor made by the operation of the cursor-moving switch, detects the click made by the operation of the clicking switch, and transmits the data thereon, and cables and connectors with which the controller, the switches and a personal computer are connected to each other. The cursor-moving switch has a structure in which the operation button is returned to the center automatically when not used.

7 Claims, 11 Drawing Sheets

POINTING DEVICE

BACKGROUND OF THE INVENTION

The present-invention relates to a pointing device used for a varisty of computers, more particularly relates to a pointing device operable with a considerably light momentum for example, lying in bed, and especially useful for disabled people with limited motor function in hands or fingers such as muscular dystrophy.

A mouse has been conventionally used as a pointing device for moving a cursor and making a click on computers and the like. The mouse is slid on a desk and the like so as to rotate a ball included in its bottom portion to detect its moving distance or direction according to the rotation of the ball. A track ball has been also used as a pointing device. The track ball is rotated by fingers or the like to detect its moving distance or direction. Another example of a pointing device is a joy stick provided with switches corresponding to moving directions to be decided a moving distance by its compression (push down) time.

Figure 15:
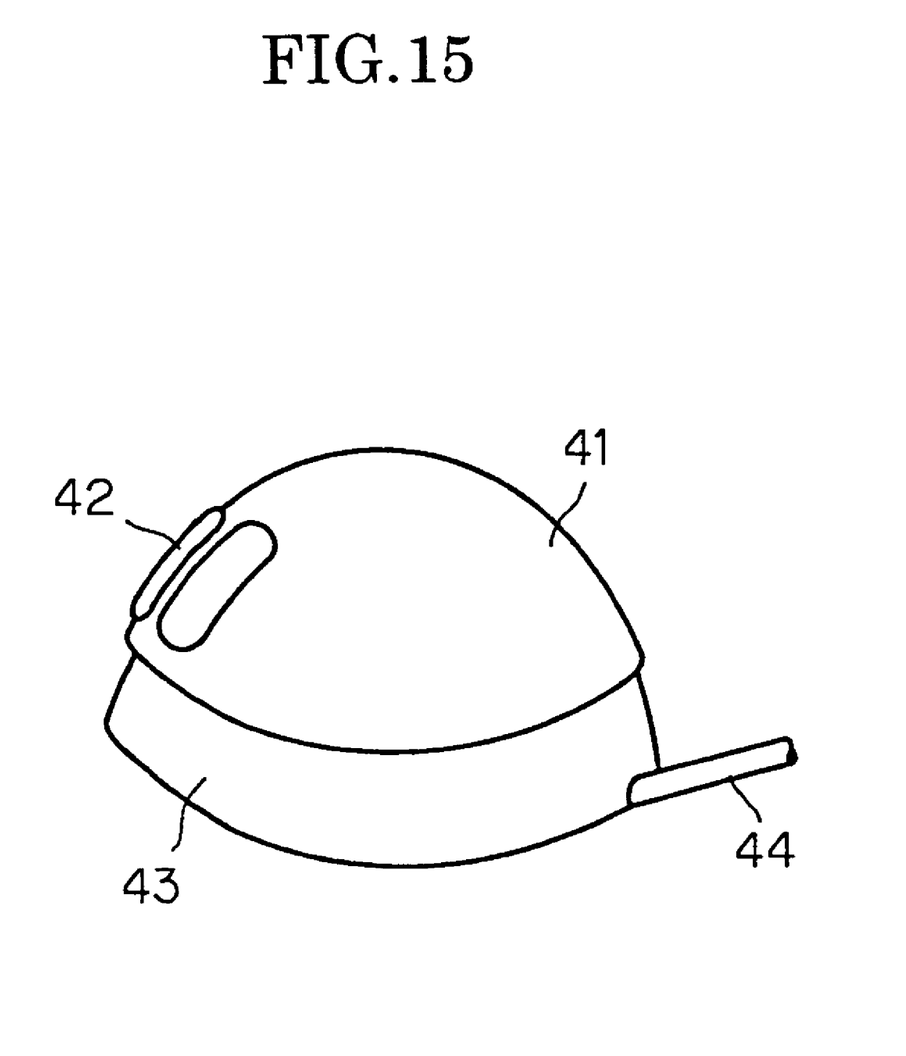
FIG. 15 is an outside view of a conventional pointing device.

FIG. 15 is an outside drawing as shown in Japanese Patent Laid-open Publication 6-259186 to depict a conventional pointing device operable with a light momentum. In FIG. 15, the reference numeral 41 designates a hemisphere operating portion operable with hands, 42 is a switch compressible by fingers or the like simultaneously with the operation of the operating portion 41, the numeral 43 depicts a body for detecting the moving direction and distance of the operating portion 41, and 44 is a cable to transmit data.

Now, in operation, the operating portion 41 is held by a palm so as to be enclosed by the palm, and the switch is touched by fingers. Then switch 42 is compressed, together with moving the operating portion 41 at a time so as to slide the operating portion 41 on the body 43. Thus, an operated change of the operating portion 41 is detected without moving the body 43 so as to transmit the change, and the pointing operation is completed.

As mentioned above, since an usual mouse as a conventional pointing device needs to rotate the ball included in its bottom by sliding the body on a desk or the like, a problem arises in that this mouse needs too much momentum for a disabled or crippled person with limited motor function in hands or fingers such as muscular dystrophy to operate a pointing device. When a user lies in bed, a place where the user's hand or finger is laid on is a rugged, irregular or non-flat surface, it may be difficult to use a mouse thereon. Further, another problem still remains that moving a cursor and operating a click should be carried out with only one hand. As to other pointing devices such as a track ball and a joy stick, another problem remains that a certain force is necessary to operate a cursor to move and a click button to activate. Like a mouse, it may be difficult for the lying user to keep such pointing devices stable on the place where the user's hand or finger is laid on. As for the conventional pointing device as shown in the Japanese Patent Laid-open Publication 6-259186, it is difficult for a disabled person with limited motor function in hands or fingers to hold an operating portion so as to enclose the operating portion by his or her palm. Further, similar to the conventional mouse, a problem still remains in this device that moving a cursor and making a click should be carried out with only one hand. Similar to such pointing devices such as a track ball, a joy stick, it may be difficult for the lying user to keep the conventional pointing devices stable on the place where the user's hand or finger is laid on; and As mentioned above, it has been substantially impossible for a disabled or crippled person lying in bed with limited motor function in hands or fingers such as muscular dystrophy to use and operate a conventional pointing device.

SUMMARY OF THE INVENTION

Then, it is an object of the present invention to provide a pointing device which can be operated by a disabled person with a declined muscular strength, even if, the person lies in bed, to move a cursor and make a click separately not only by one hand but also by a body portion or regions having a motor function with a light touch, i.e. without any complex movement and large motion, and which does not need any operation area.

The present invention comprises:

a flat cursor-moving switch for moving a cursor;

a band-shaped clicking switch for making a right click and a left click and the like;

a detachable cloth sheet which is attached to the rear of the cursor-moving switch and spread on the place where the cursor-moving switch is operated to enable the installation of the cursor-moving switch on a place other than a flat surface;

a controller which measures the direction and distance of the movement of the cursor made by the operation of the cursor-moving switch, detects the click made by the operation of the clicking switch, and transmits the data thereon; and, cables and connectors with which the controller, the switches and a personal computer are connected to each other;

wherein the cursor-moving switch has a structure in which the operation electrode is automatically returned to the center when not used, The present invention also comprises:

a flat cursor-moving switch for moving a cursor;

a band-shaped clicking switch for making a right click and a left click;

a controller which measures the direction and distance of the movement of the cursor made by the operation of the cursor-moving switch, detects the click made by the operation of the clicking switch, and transmits the data to a personal computer thereon; and, cables and connectors with which the controller, the switches and the personal computer are connected to each other;

wherein the cursor-moving switch has a structure in which the operation button i.e. the operation electrode is automatically returned to the center position when not used.

DETAILED DESCRIPTION OF THE PREFERRED EMBODIMENTS

In a pointing device of the present invention, a cursor-moving operation and a click operation are separated and applied to different switches, if necessary, with a cloth sheet. It is useful for its user to provide the cloth sheet which is attached to the rear of the cursor-moving switch and spread on the place where the cursor-moving switch is operated to enable the installation of the cursor-moving switch on a place. Furthermore, it is able to decline the operated volume of its user, by providing the cursor-moving switch with a structure in which the operation button is automatically returned to the center position when not used.

Now referring to the drawings, one embodiment of the present invention will be described below.

Figure 1:
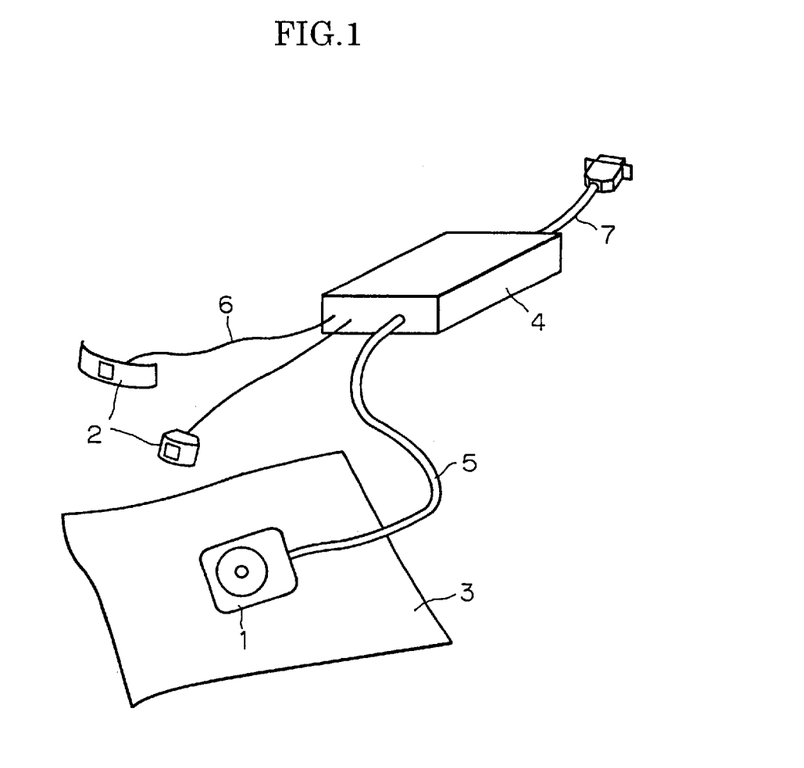
FIG. 1 is an outside view illustrating a pointing device according to one preferred embodiment of the present invention.

FIG. 1 is an outside view illustrating a pointing device according to one preferred embodiment of the present invention. In FIG. 1, the reference numeral 1 depicts a cursor-moving switch, numeral 2 depicts clicking switches for inputting menus and coordinates designated with a cursor, and a right click-button and a left click-button are mounted at the clicking switches respectively.

The numeral 3 is a cloth sheet which is attached to the rear of the cursor-moving switch and the cloth sheet 3 is spread on a requested place where the cursor-moving switch should be installed.

The numeral 4 is a controller which measures the direction and distance of the movement of the cursor made by the operation of the cursor-moving switch 1, detects the clicks made by the operation of the clicking switches 2, and transmits the data thereon, and the numeral 5 is a cable to connect the cursor-moving switch 1 to the controller 4. The numeral 6 designates cables to connect the clicking switches 2 to the controller 4. The numeral, 7 designates a cable to connect the controller 4 to a mouse input terminal of a personal computer.

The pointing device; which is one embodiment of the present invention as described above, is operable keeping user's palm at a level by making the cursor-moving switch flat. Further, since switches are separated into the cursor-moving switch 1 and the clicking switches 2, an operation may be carried out not only by one hand but also by any body portion that is movable. Each clicking switch 2 has a touch switch, operable with a light touch, utilizing induced voltage by commercial power supply. Each clicking switch 2 is band-shaped, and an overlapping portion of the band is fastened with a fastening member such as MAGIC-TAPE (Registered Trademark in Japan; a type of fastening tape having a lot of small hooks thereon) which is easily detachable and adjustable in size according to the size of wearing portion.

Since a service space or place to be used for a pointing device maybe not only a desk-top but also user's knee, lap and a top of bed where an operable body portion such as a finger is naturally laid on, and since the service space depends on the user, the rear of the cursor-moving switch 1 is attached to the cloth sheet 3 to install the switch 1 by spreading the sheet 3 on the user's body, bed, FUTON (a type of duvet or bedspread) or the like. The cloth sheet 3 stabilizes the switch 1, even it the service space or place where user's hand or finger is laid is a rugged, irregular or non-flat surface. The cloth sheet 3 is not integral to the cursor-moving switch 1, but is detachable from the cursor-moving switch 1. The size of the cloth sheet may preferably be that of a handkerchief, and the material thereof may be as flexible and non-slippery as denims.

Figure 2:
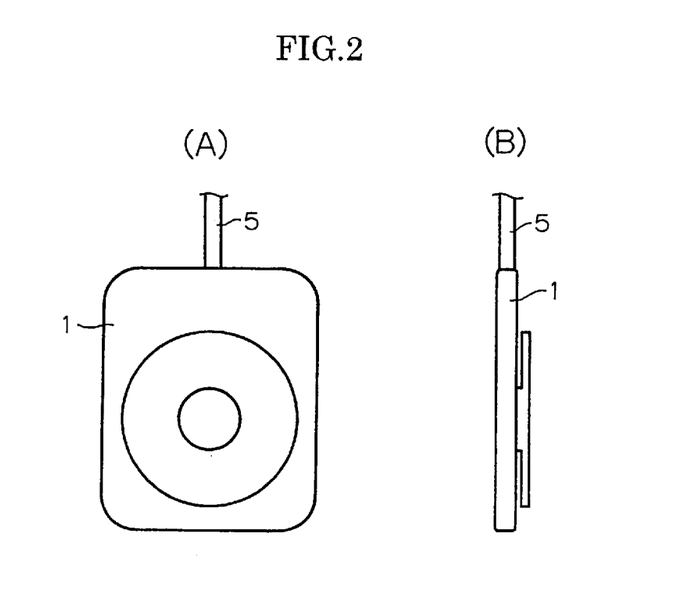
FIGS. 2A and 2B are a plan view and a side elevation of the cursor-moving switch as shown in FIG. 1.
Figure 3:
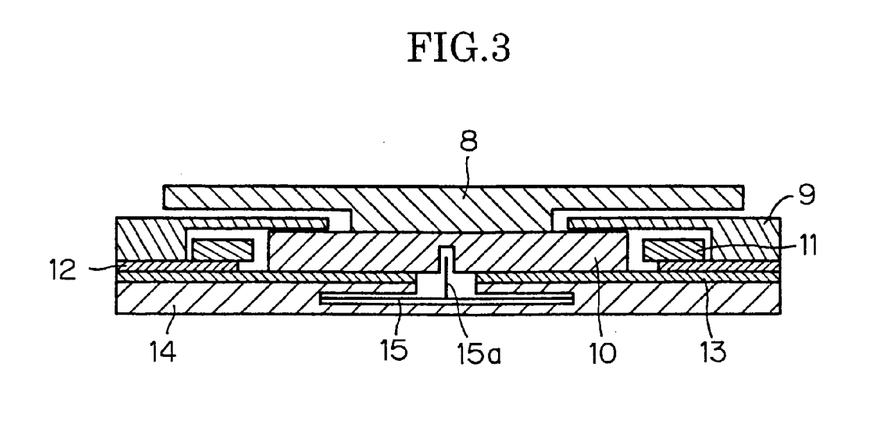
FIG. 3 is a cross-sectional view of the cursor-moving switch as shown in FIGS. 2A and 2B.
Figure 4:
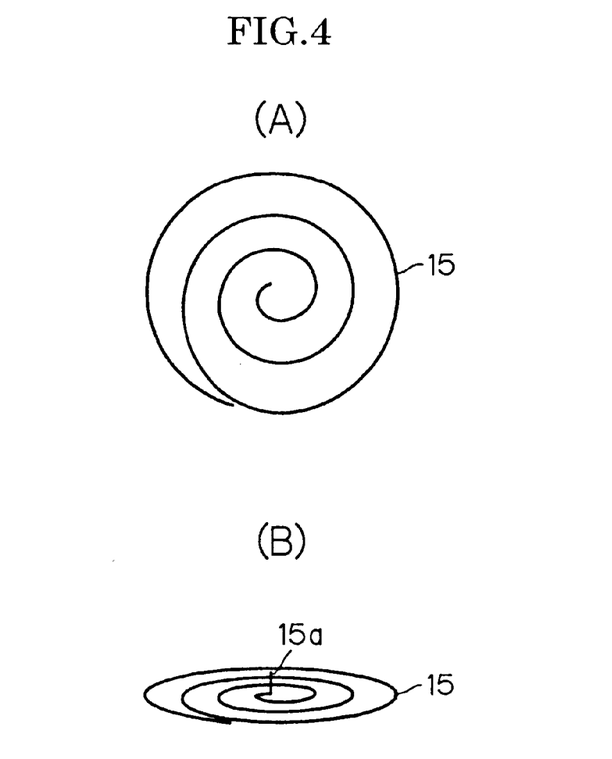
FIGS. 4A and 4B are a plan view and a perspective view showing an example of elastic member as shown in FIG. 3.

FIGS. 2(A) and 2(B) show a plan view (FIG. 2(A)) and a side elevation (FIG. 2(B)) of the cursor-moving switch 1 of one embodiment of the pointing device according to the present invention. FIG. 3 shows a cross-sectional view of the cursor-moving switch 1 of one embodiment of the pointing device according to the present invention. FIGS. 4 show a plan view and a perspective view showing a spiral or volute spring as an example of the elastic member which is used for the cursor-moving switch 1. The cursor-moving switch 1 has an input electrode 13, an operation electrode 10 and direction electrodes 11 on its substrate 14, and formed flatly.

At the upper part, an operating portion 8 is mounted and a holding member 9 is also provided to prevent the operation electrode 10, movable horizontally, from removing. The operation electrode 10 is in contact with the input electrode 13 and returned to the center automatically by the volute spring 15 mounted at the bottom of the switch, when not used. When the operation electrode 10 is slid in the desired direction of the cursor to move by laying user's hand or finger on,the operating portion 8, an electrical short-circuit between the direction electrode 11 and the input electrode 13 is made by bringing the operation electrode 10 into contact with the direction electrode 11 which is connected to the input terminal of the controller 4, so as to transmit an input signal to the input terminal of a one-chip micro-computer included in the controller 4 via the cable 5. Based on the input signal the controller 4 outputs output pulses corresponding to the moving direction to the personal computer.

For the cursor-moving switch 1, the operation electrode 10 is brought into contact with the direction electrode 11 by sliding the operating portion 8, then the input electrode 13 and the direction electrode 11 are electrically conducted through the operation electrode 10. Since the input signal is inputted into the controller 4, the cursor is simply stopped by sliding the operating portion 8 so as to disengage the operation electrode 10 from the direction electrode 11 when user's hand or finger is laid on the operating portion 8. When the user's hand or finger is detached from the operating portion 8 the cursor is stopped, because the operating portion a and the operation electrode 10 are returned to the center position by the force of a spring 15 to disengage the direction electrode 11 from the input electrode 13.

Figure 5:
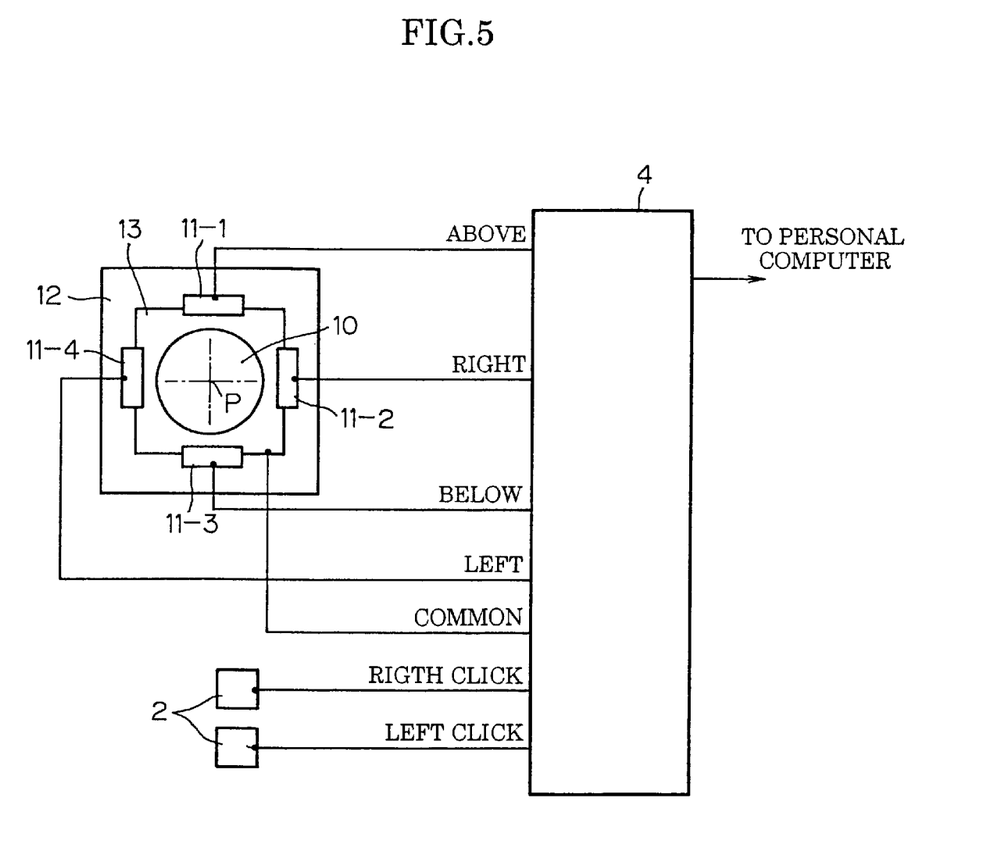
FIG. 5 is a block diagram showing a method for detecting an operated value as shown in FIG. 1.

FIG. 5 is a block diagram to explain a detecting method for detecting a moving direction and a moving distance inputted from the cursor-moving switch 1 and a click signal inputted from the clicking switch 2. As described above, the clicking switch 2 has a touch switch utilizing induced voltage by commercial power supply. When user's hand or finger touches the electrode portion of the clicking switch 2, the controller 4 detects the click signal. The moving direction and distance of the cursor are found with the controller 4 by detecting the contact of the operation electrode 10 with four direction electrodes 11-1 to 11-4 which are located above, to the right; below, and to the left.

For example, when the operation electrode 10 is brought into contact with the upper direction electrode 11-1, the cursor moves upward. When the operation electrode 10 is brought into contact with both the upper direction electrode 11-1 and right direction electrode 11-2 at the same time, the cursor moves in an oblique direction of above and right. While a direction electrode and the operation electrode are in contact with each other, the cursor keeps moving, and stops upon disconnection of the contact between them. The operating stroke required to start moving the cursor may be determined by the distance or gap between the operation electrode 10 and the direction electrode 11. In the preferred embodiment of the present invention, the operating stroke may be 0.75 mm, and the required operation pressure may be 10 and a few grams, thus the operation is carried out with a very little momentum.

As shown in FIGS. 3 and 5, the cursor-moving switch 1 is provided with the input electrode 13 disposed on the flat substrate 14, the operation electrode 10 horizontally slidable on a surface of the input electrode 13, the direction electrodes 11-1, 11-2, 11-3 and 11-4 opposingly disposed at two orthogonal axes on the substrate 14 through insulating material 12, and the elastic member 15 to keep the center of the operation electrode 10 at the crossing center position P of the two orthogonal axes, thereby keeping the center of the operation electrode 10 at the crossing center position P when not used.

The elastic member 15 is made of, for example, a flat volute spring as shown in FIG. 4. Its periphery is fixed at the switch substrate 14 and its center portion is movable horizontally. A coupling pin 15a projected from the center portion is engaged with the center of the operation electrode 10. Therefore, the operation electrode 10 can be moved horizontally in any direction, and returned to the center position if the user release his or her hands (that is, when not used).

Figure 6:
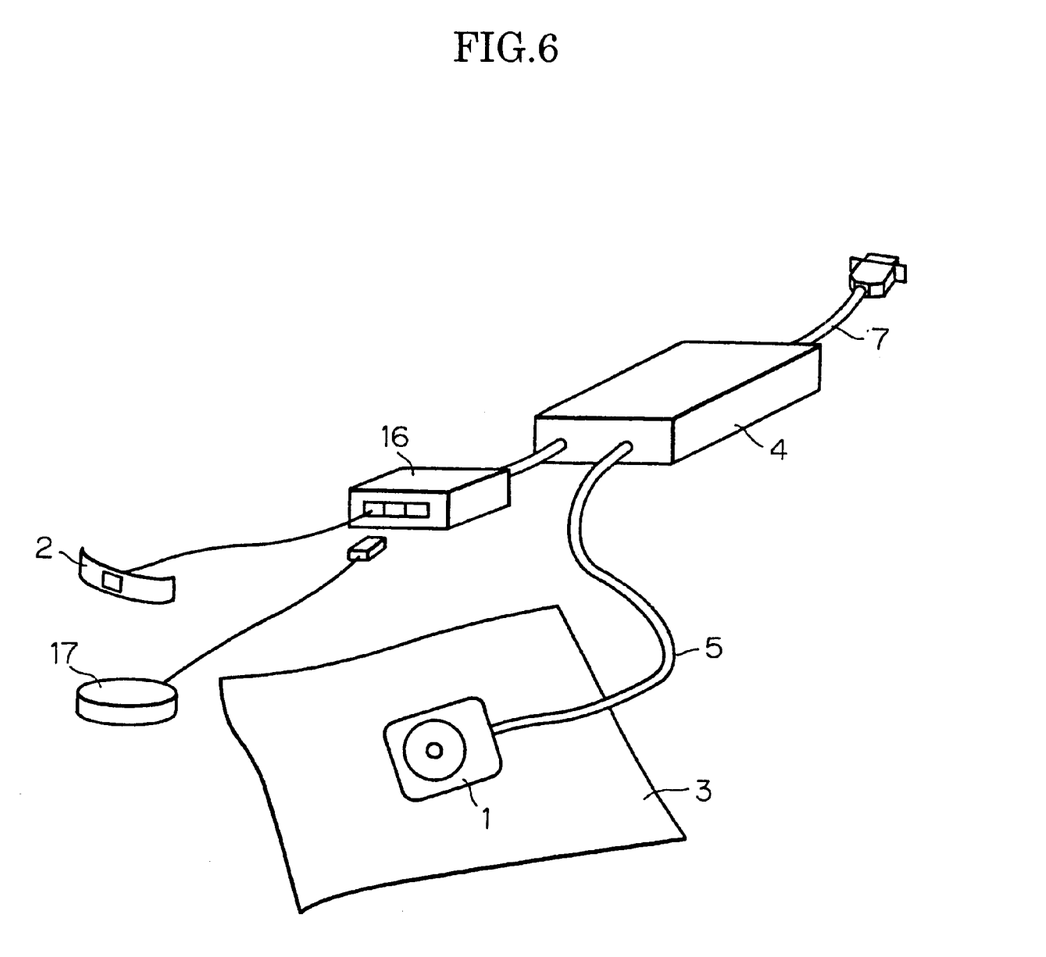
FIG. 6 is an outside view illustrating a pointing device utilizing another preferred embodiment of the present invention.

FIG. 6 depicts a pointing device of another preferred embodiment according to the present invention. In this embodiment, a relay box 16 is disposed between the clicking switch 2 and the controller 4, thereby easily connecting a conventional micro switch, a respiration switch (not shown in PIG. 6) operated by aspiration or expiration with mouth on, a pressure-sensitive switch 17 operable with foot, elbow etc. on and other various switches thereto.

Figure 7:
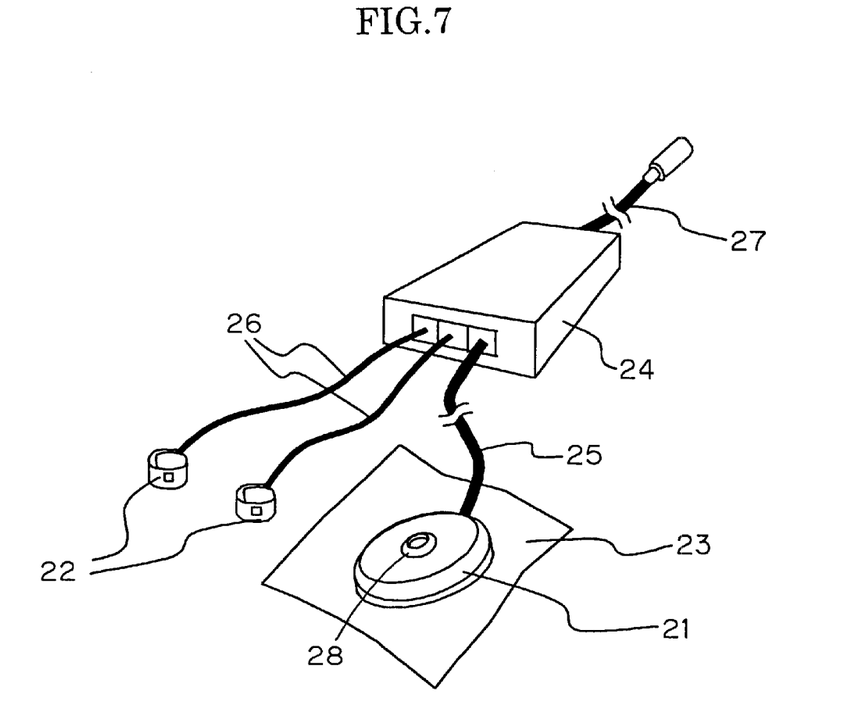
FIG. 7 is also an outside view illustrating a pointing device utilizing another preferred embodiment of the present invention.

FIG. 7 is also an outside view illustrating a pointing device utilizing another a preferred embodiment of the present invention. Referring now to FIG. 7, the reference numeral 21 depicts a cursor-moving switch for moving a cursor. Numeral 22 depicts clicking switches for inputting menus and coordinates designated with a cursor, where the clicking switch 22 is provided with two switches for making a left click and a right click respectively. Reference numeral 23 is a detachable cloth sheet attached to the cursor-moving switch 21 as needed. The cloth sheet 23 is spread on a place where the user wants to install the cursor-moving switch 21. Numeral 24 depicts a controller for measuring the direction and distance of movement made by operating the cursor-moving switch 21, for detecting a click signal made by operating the clicking switch 22 and for transmitting transmit the data to a personal computer. Numeral 25 is a cable to connect the cursor-moving switch 21 to the controller 24. Reference numeral 26 depicts a cable to connect the clicking switches 22 to the controller 24, and reference numeral 27 is a cable to connect a mouse-input terminal of the personal computer to the controller 24.

In the pointing device as constructed above, the cursor-moving switch 21 is made flat to be operated by keeping user's palm flat or at a level. Further, the switches are separately provided with, for cursor-moving and clicking, to enable to be operated not only by one hand but also by other movable body portions, such as other hand and fingers, foot toes and the like.

The clicking switch 22 is provided with a touch switch utilizing induced voltage by commercial power supply to be easily operated with a light touch. The band-shaped, and an overlapping portion of the band is fastened with the aforementioned tape to be detachably fastened in order to be fitted on user's finger according to its size.

The service space or place for a pointing device may be not only a desk-top but also user's knee or lap or a top of bed where an operable body portion such as a finger is naturally laid on, and the service space may change according to the user. The rear of the cursor-moving switch 21 is attached to the cloth sheet 23 to install the switch 21 by spreading the cloth sheet with the switch on the user's body, bed, FUTON (a type of duvet or bedspread) or the like. The cloth sheet 23 stabilizes the switch 21, even if the service space or place where user's hand or finger is laid is a rugged, irregular or non-flat surface. The cloth sheet 23 is not integral to the cursor-moving switch 21, but is detachable from the cursor-moving switch 21. The size of the cloth sheet may preferably be that of a handkerchief, and the material thereof may be as flexible and non-slippery as denims.

Figure 8:
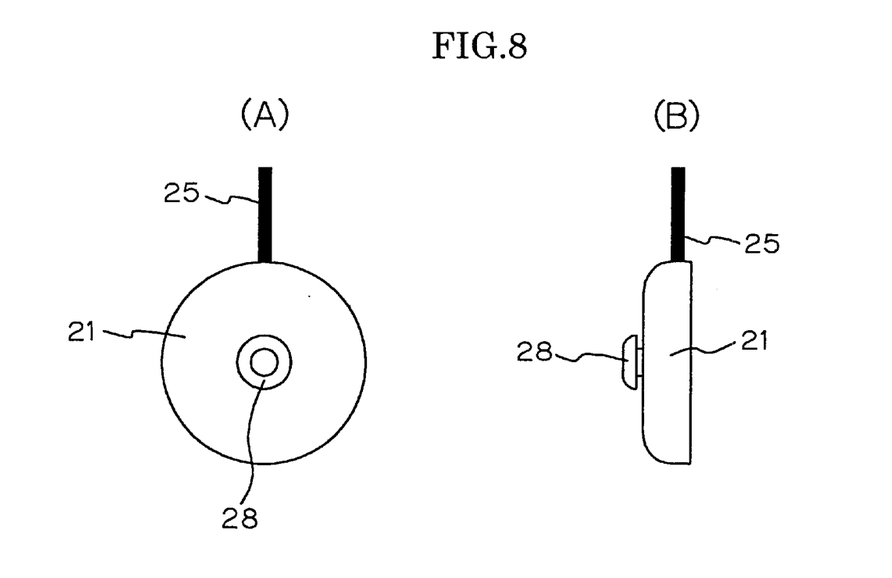
FIGS. 8(A) and 8(B) are a plan view and a side elevation of the cursor-moving switch as shown in FIG. 7.
Figure 9:
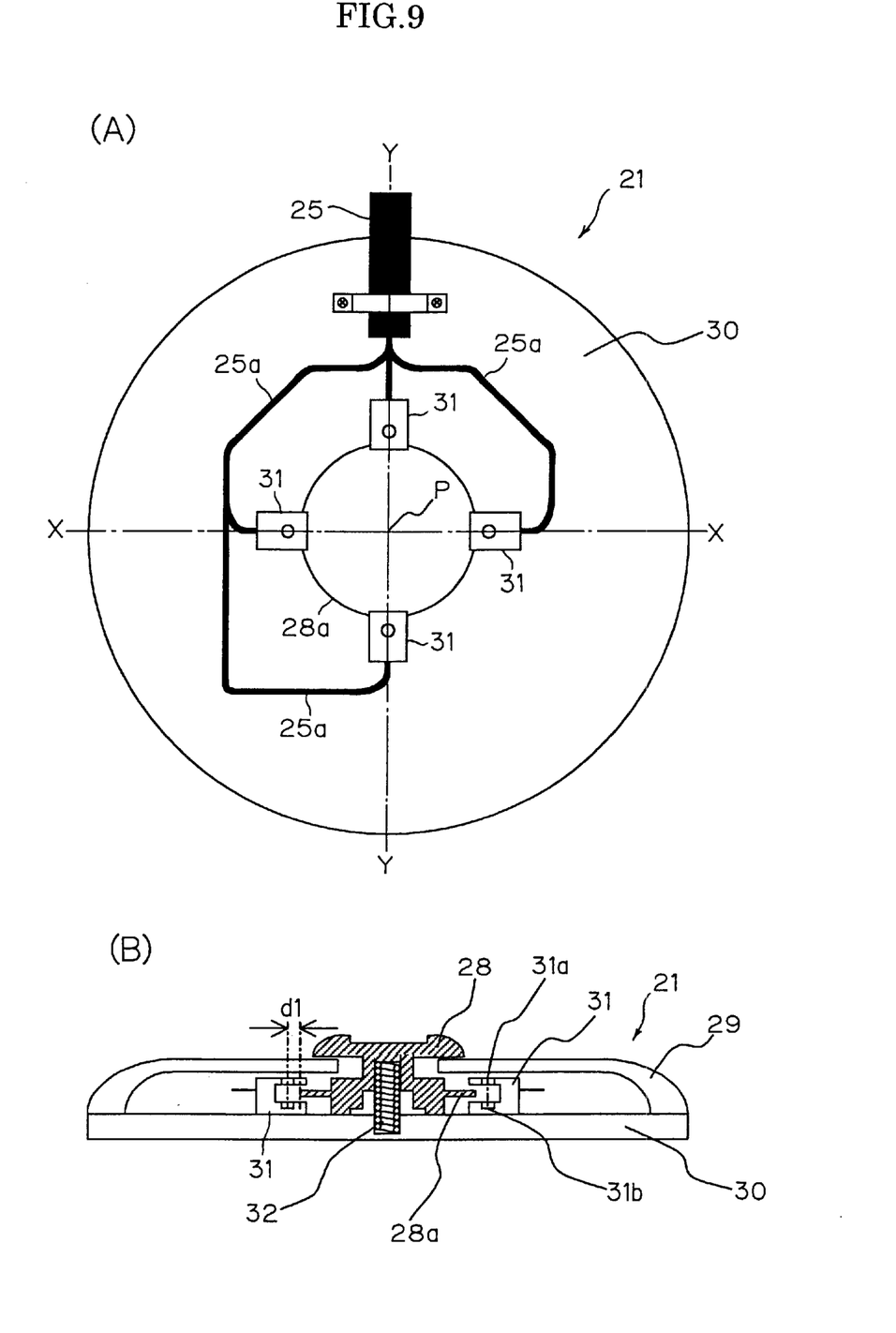
FIGS. 9(A) and 9(B) are an inner construction view and a sectional side elevation of the cursor-moving switch as shown in FIG. 7.

FIGS. 8(A) and 8(B) are a plan view (FIG. 8(A)) and a side elevation (FIG. 8(B)) of the cursor-moving switch 21 as shown in FIG. 7. FIGS. 9(A) and 9(B) are an inner construction view (FIG. 9(A)) and a sectional side elevation (FIG. 9(B)) of the cursor-moving switch 21. FIGS. 10(A) and 10(B) depict an arrangement view of coil spring 32, when the operation button is not used (FIG. 10(A)), and another arrangement view of the coil spring 32, when the operation button is operated (FIG. 10(B)), as an example of the elastic member used for the cursor-moving switch 21. The cursor-moving switch 21 is, as shown in FIGS. 9, provided with an operation button 28 horizontally movable or slidable on a substrate or a flat base plate 30, four optical devices 31 operable as detecting elements of the operating direction opposingly disposed at two orthogonal axes (X-X, Y-Y), a cable 25 and inner wiring 25a to connect the cursor-moving switch 21 to the controller 24, an elastic member 32 to keep the center of the operation electrode 28 at the crossing center position P of the two orthogonal axes (X-X, Y-Y), and a top lid 29 to protect an inner circuit and to prevent the operation button 28 from removing.

Figure 10:
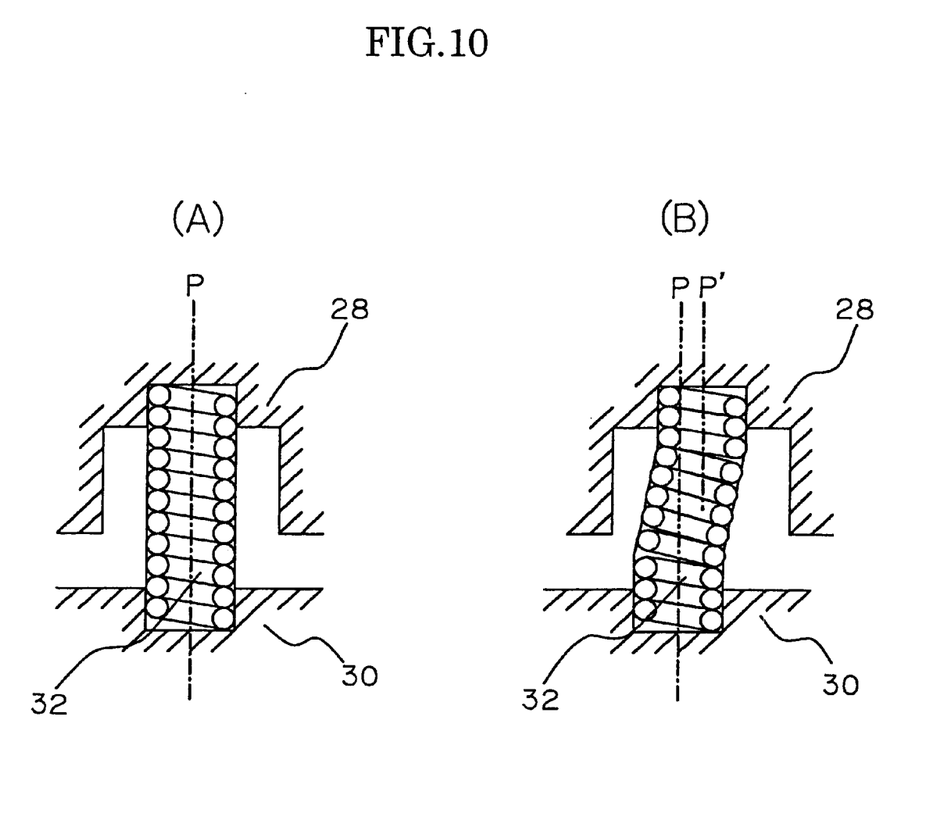
FIGS. 10(A) and 10(B) are arrangement views of the elastic member used in the cursor-moving switch as shown in FIG. 7 to explain the configuration thereof.

The elastic member 32 is made of a.g. a coil spring as shown in FIG. 10. Its one end is fixed at the bottom plate 30, and the other end is engaged with a central bottom of the operation button 28.

The coil spring 32 is straightened up in its shape, and the center of the operation button 28 is held at the center position P of the two axes as shown in FIG. 10(A) when not used.

When the user's hand or a finger is laid on the operation button 28 to slide the operation button 28 in a direction which the user wants to move the cursor, the center P of the operation button 28 horizontally moves to another point P', as shown in FIG. 10(B), and the coil spring 32 is changed in shape, thereby causing restoring force (operation pressure) to return to the original shape. When the user releases his or her hands from the operation button 28, the center of the operation button 28 is returned to the center position P by restoring force of the coil spring 32.

The cursor-moving switch 21, as shown in FIG. 9(B), is provided with the optical devices 31 and the shield disk 28a attached to the operation button 28, and each optical axis between light-emitting portion 31a and light-receiving portion 31b of each optical device 31 is kept uninterrupted by the shield disk 28a, when not used. When the operation button 28 is operated to slide, the shield disk 28a interrupts the optical axis between the light-emitting portion 31a and the light-receiving portion 31b of the optical device 31 in which direction the operation button 28 slides, and the interrupted signal in the optical device 31 is transmitted to an input circuit included in the controller 24 through the cable 25. To stop the cursor when the user's hand or finger is laid on the operation button 28, the operation button 28 may be slid back in the opposite direction to enable the optical axis between the light-emitting portion 31a and the light-receiving portion 31b of the optical device 31 to pass through. If the user's hand is released from the operation button 28 at a position where the operation button 28 has been slid, the operation button 28 is forced back to the center by the coil spring 32, thereby enabling all the lights between four respective light-emitting portions 31a and four light-receiving portions 31b to pass therebetween to stop the cursor.

An operating stroke required to move the cursor is determined by the difference d1 between the radius of the shield disk 28a and the distance from the center position P to each optical axis of the optical device 31. In the preferred embodiment, the operation stroke is 0.75 mm and the compression to operate is about 10 grams, then a very little momentum is necessary for operation.

Figure 11:
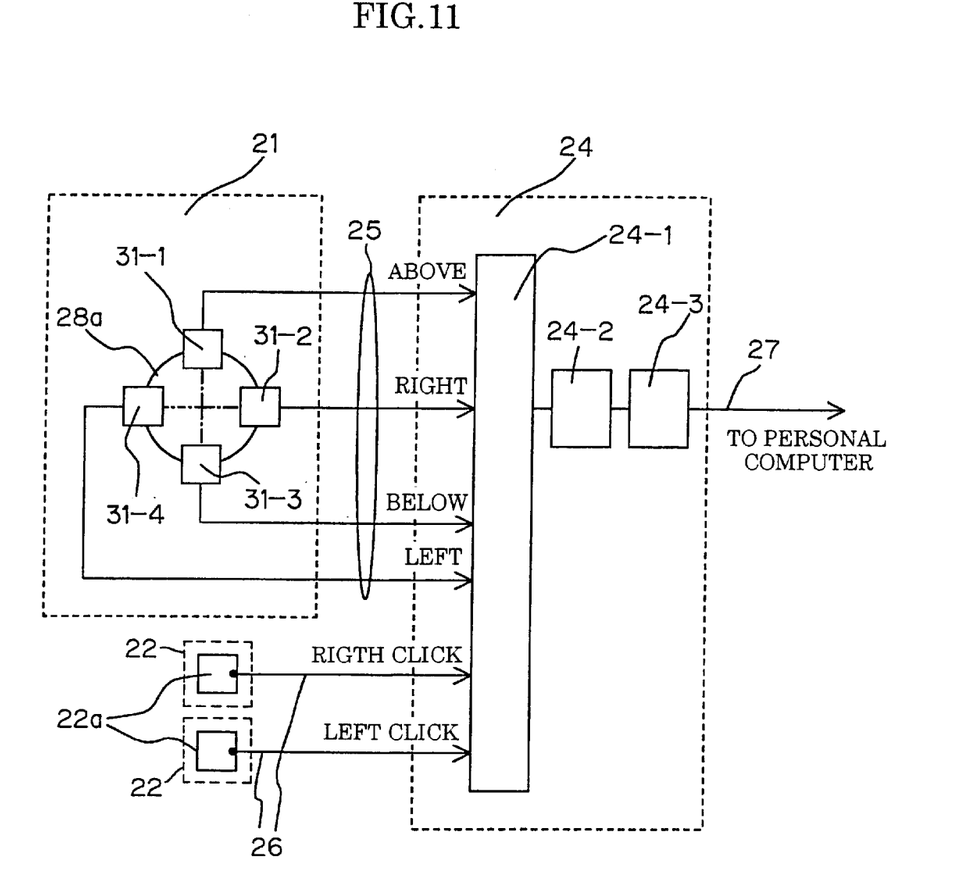
FIG. 11 is a block diagram showing a method for detecting an operated value of the pointing device as shown in FIG. 7.

FIG. 11 is a block diagram to explain a detecting method for detecting a moving direction and a moving distance inputted through the cursor-moving switch 21 and a click signal inputted through the clicking switch 22. As described above, the clicking switch 22 has the touch switch, utilizing induced voltage by commercial power supply. When the user's hand or finger touches electrode 22a of the clicking switch 22, the click signal is detected by a processing circuit 24-2 through an input circuit 24-1 in the controller 24, then converted to the standard interface signals for personal computers to be transmitted to a personal computer via an output circuit 24-3 and the cable 27.

The processing circuit 24-2 determines the direction and distance of the cursor to move by judging an interrupted signal of any optical axis of the four optical devices 31-1 to 31-4 which are located above, to the right, below, and to the left. For example, when an interruption of the optical axis in the optical device 31-1, the cursor moves upwards. When both axes of the upper optical device 31-1 and the right optical device are interrupted at the same time, the cursor moves in an oblique direction of above and right. The cursor keeps moving while an optical axis is being interrupted. When the interruption of the optical axis is removed, the cursor stops moving. The direction and distance of the movement determined by the processing circuit 24-2 is converted to the standard interface signals for personal computers, then transmitted to a personal computer through the output circuit 24-3 and the cable 27.

Moving speed of the cursor is determined by the processing circuit 24-2, and the cursor keeps moving in the same direction at an uniform speed or at a changing speed such as an accelerating speed while an interruption for the optical axis is being held.

Figure 12:
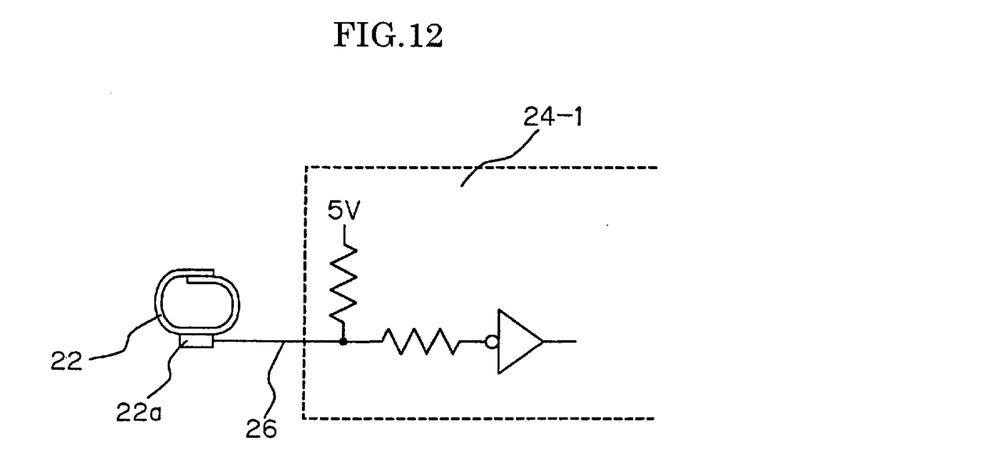
FIG. 12 is a connection diagram showing an example of clicking switch according to the present invention.

FIG. 12 explains one embodiment of interface between the clicking switch 22 and the input circuit 24-1. The clicking switch 22 is band-shaped and provided with cloth, an insulator. The electrode 22a attached to the outside of the clicking switch 22 is connected to an input terminal with high impedance through a pull-up resister, for example a C-MOS gate circuit, in the input circuit 24-1. When the user's hand or finger touches the electrode 22a, an induced voltage caused between the ground and the electrode by the commercial power supply can be detected.

FIG. 13(A) explains another embodiment of interface between the clicking switch 22 and the input circuit 24-1 The clicking switch 22 is band-shaped and provided with cloth, an insulator. The electrode 22a attached to the outside of the clicking switch 22 is connected to an input terminal with high impedance through a pull-up resister, for example, a C-MOS gate circuit in the input circuit 24-1. An electrode 22b attached to the inside of the clicking switch 22 is connected to 0V via a resister in the input circuit 24-1.

Figure 13:
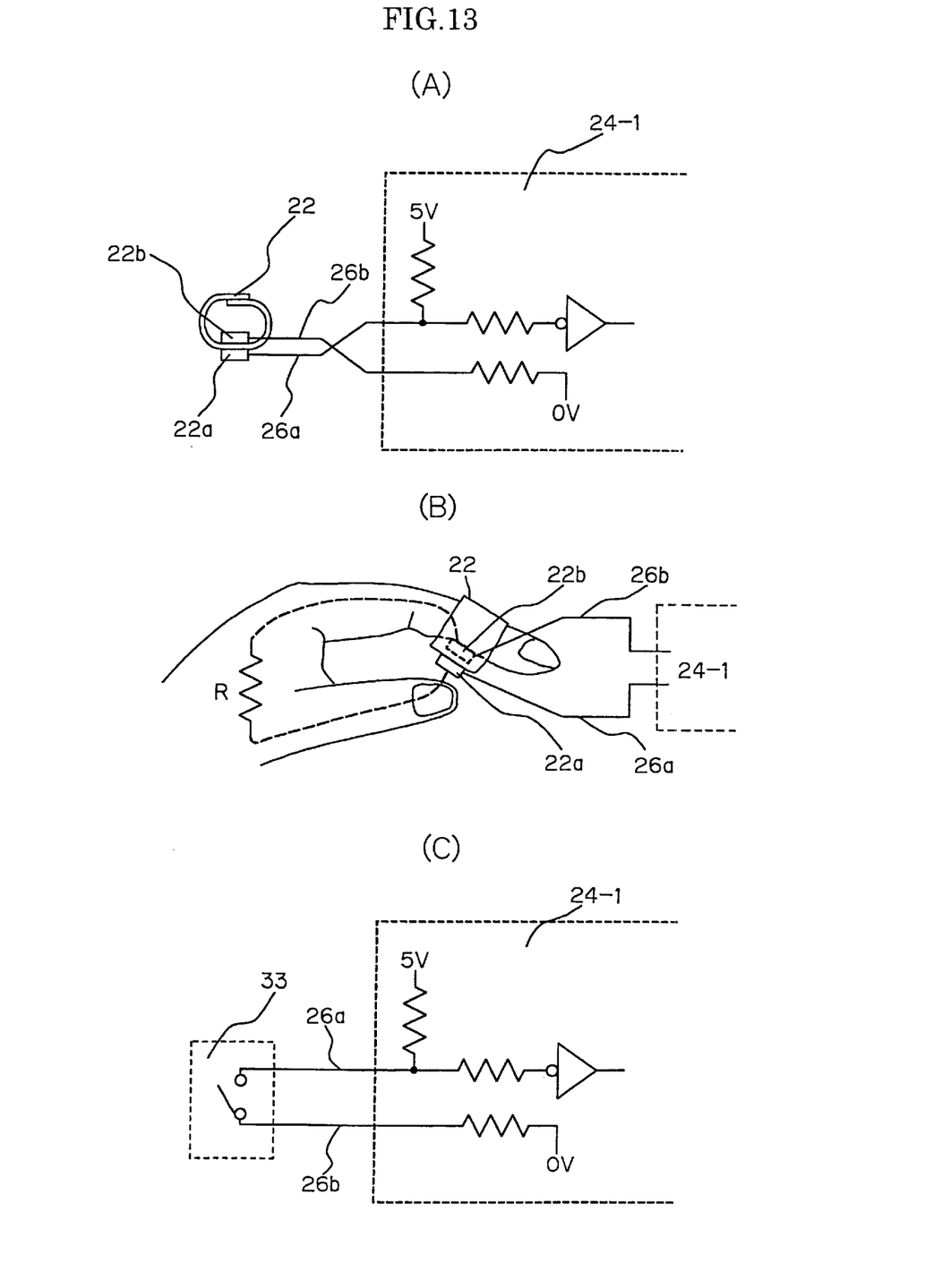
FIGS. 13(A), 13(B) and 13(C) are connection diagrams showing another example of clicking switch according to the present invention.

FIG. 13(B) illustrates the clicking switch 22, shown in FIG. 13 (A), wore on a finger. The inner electrode 22b is always in contact with the finger. When the outer electrode 22a is touched by another finger, the electrodes 22a and 22b establishes a closed loop through internal resistance R of the fingers and hand, thereby decreasing the input terminal voltage of the high impedance input circuit and allowing the voltage to be detected as a click signal. This embodiment may be effectively applied to a detecting means for sensitively detecting a click in a worse condition, for example, a battery driven personal computer where a good induced voltage by commercial power supply may not occur.

FIG. 13(C) explains another embodiment of interface between another clicking switch 33 and controller 24. To the input circuit 24-1 as shown in FIG. 13(A), a variety of clicking switches 33, such as a conventional micro switch, a respiration switch operated by aspiration or expiration with mouth on, a pressure-sensitive switch operable with foot, elbow etc. on are connected, so that a click operation may be easily carried out by other motor functions other than finger function.

Figure 14:
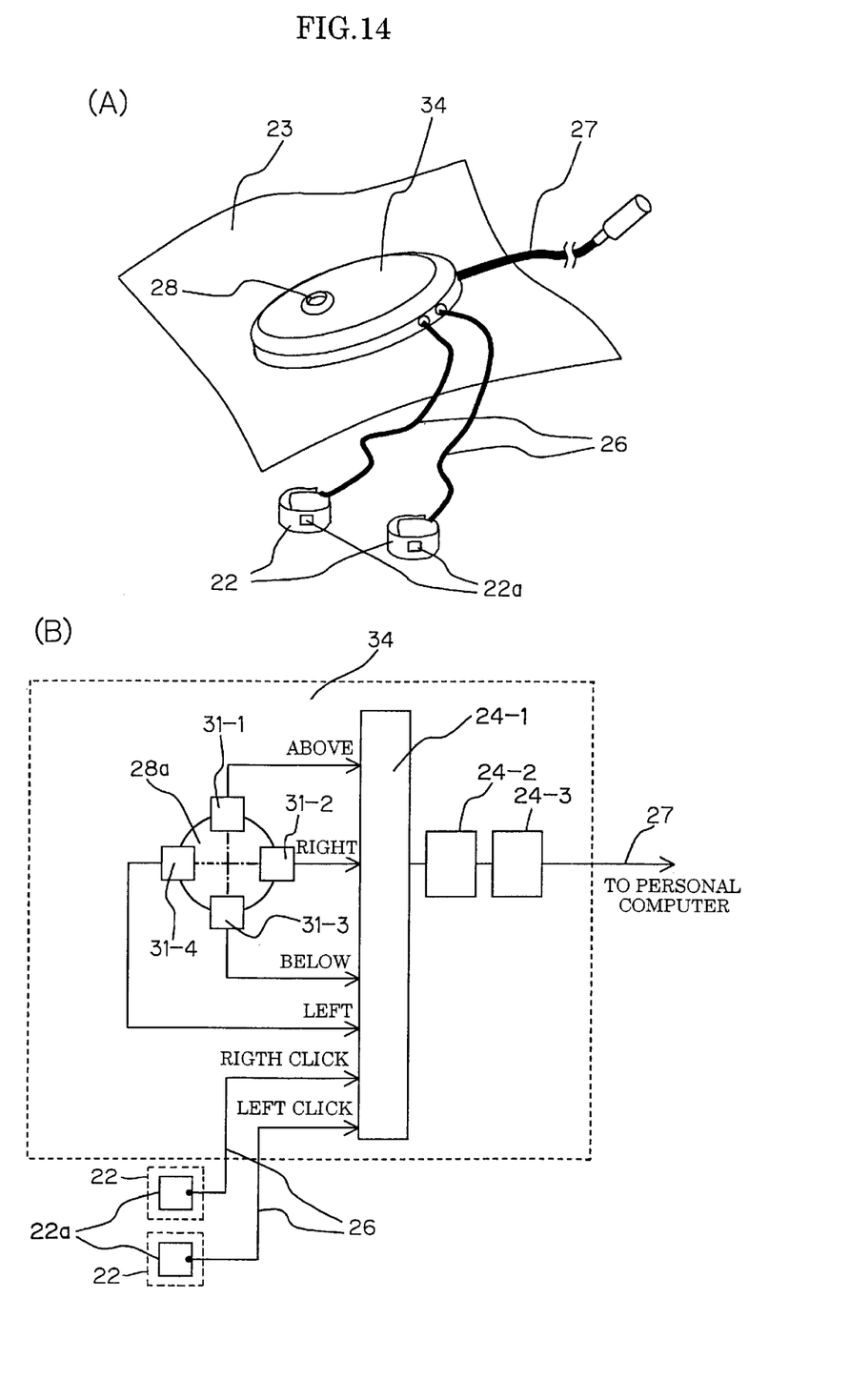
FIGS. 14(A) and 14(B) are an outside view and a block diagram showing another embodiment of the pointing device according to the present invention.

FIG. 14 depicts another embodiment of the pointing device according to the present invention, which is an integration of the cursor-moving switch 21 and the controller 24 shown in FIG. 7. FIG. 14(A) is an outside view of the embodiment. Reference numeral 34 depicts a flat cursor-moving switch including controller function, which is an integration of the cursor-moving switch 21 and the controller 24 shown in FIG. 7. Numeral 28 is an operation button for moving the cursor, numeral 22 shows band-shaped clicking switch having the electrode 22a to detect a touch by hand or finger, numeral 26 is a cable to connect the clicking switch 22 to the cursor-moving switch 34 including controller function therein, reference numeral 27 is a cable to connect the cursor-moving switch 34 including controller function therein to a mouse-connecting terminal of a personal computer, and numeral 23 depicts a detachable cloth sheet which is attached to the rear of the cursor-moving switch 34 and spread on the place where the cursor-moving switch is operated to enable the installation of the cursor-moving switch on a place other than a flat surface, as needed.

FIG. 14(B) is a block diagram showing a circuit constitution of a pointing device as in FIG. 14(A), and shows an integration of the cursor-moving switch 21 and the controller 24 shown in FIG. 11. Comparing with the constitutional circuit elements as shown FIG. 11, the diagram of FIG. 14(B) is the same as that of FIG., 11 except that it does not contain the cable 25 to connect the cursor-moving switch 21 to the controller 24. This embodiment is directed to minimize the whole device in size and to decrease the number of the constitutional elements by integrating the controller into the cursor-moving switch with high density assembling while keeping the shape of the cursor-moving switch flat.

As described above, the present invention realizes a pointing device comprised of:

a flat cursor-moving switch for moving a cursor, a band-shaped clicking switch for making a right click and a left click, a detachable cloth sheet which is attached to the rear of the cursor-moving switch and spread on the place where the cursor-moving switch is operated to enable the installation of the cursor-moving switch on a place other than a flat surface, as needed, a controller which measures the direction and distance of the movement of the cursor made by the operation of the cursor-moving switch, detects the click made by the operation of the clicking switch, and transmits the data thereon; and, cables and connectors with which the controller, the switches and a personal computer are connected to each other;

wherein the cursor-moving switch has a structure in which the operation electrode is automatically returned to the center when not used, thereby providing the following advantages:

(a) The cursor-moving switch may be operated with a palm at a level.

(b) Operation may be carried out not only by one hand but also by any body portion that is movable.

(c) A pointing device according to the present invention may be used by a disabled or crippled person with limited motor function in hands or fingers at his or her most favorable position.

(d) The pointing device does not require any large service space or place and is operable sitting in a wheel chair or lying in bed.

(e) The cursor-moving switch and the clicking switch are operable with a very little momentum.

(f) In addition to the band-shaped clicking switch according to the present invention, a variety of switches such as a respiration switch, a pressure sensitive switch may be applicable as clicking switches, thereby allowing the user to choose the most preferable operation method according to his or her motor function.

What is claimed is:

1. A pointing device comprising:

a flat cursor-moving switch for moving a cursor;

a cloth sheet which is attached to the rear of the cursor-moving switch and spread on a place where a lying operator's hand or finger is laid on to install the cursor-moving switch to be operated on a rugged, irregular or non flat surface;

a band-shaped clicking switch provided at the band with an electrode for making a right click and a left click and provided at overlapping portion of the band with a detachable fastening member adjustable in size according to the size of wearing portion;

a controller which measures the direction and distance of the movement of the cursor made by the operation of the cursor-moving switch, detects the click made by the operation of the clicking switch, and transmits the data to a personal computer; and cables and connectors with which the controller, the switches and the personal computer are connected to each other, wherein cursor-moving switch has a structure in which an operation button is automatically returned to the center position when the cursor-moving switch is not in use.

2. The pointing device as recited in claim 1, wherein the cloth sheet is detachable from the cursor-moving switch.

3. The pointing device as recited in claim 1 or 2 further comprising a relay box between the clicking switch and the controller, thereby allowing a variety of switches such as a respiration switch, a pressure sensitive switch and the like to be used in addition to the clicking switch.

4. The pointing device as recited in claim 1 or 2, wherein the cursor-moving switch comprises:

a flat substrate;

an input electrode disposed on upper surface of the substrate;

an operation electrode horizontally slidable on the surface of the input electrode;

direction electrodes opposingly disposed at two orthogonal axes on the substrate; and an elastic member for keeping the center of the operation electrode at the crossing position of the two orthogonal axes, wherein the operation electrode is automatically returned by the elastic member to its center position when not used.

5. The pointing device as recited in claim 1 or 2, wherein the cursor-moving switch comprises:

a flat substrate;

an input electrode disposed on upper surface of the substrate;

an operation electrode horizontally slidable on the surface of the input electrode;

direction electrodes opposingly disposed at two orthogonal axes on the substrate; and an elastic member for keeping the center of the operation electrode at the crossing position of the two orthogonal axes, wherein the elastic member is made of a flat volute spring, its periphery is fixed at the substrate, and its center portion is engaged with the center of the operation electrode.

6. The pointing device as recited in claim 1 or 2, wherein the cursor-moving switch comprises:

a flat base plate:

an operation button disposed on the upper surface of the base plate, the operation button having a shield disk horizontally movable;

optical devices to detect operation-direction for detecting interrupted signal of optical axis by the shield disk, the optical devices being symmetrically disposed at two orthogonal axes on the base plate; and an elastic member for keeping the center of the operation button at the crossing position of the two orthogonal axes, wherein the operation button is automatically returned to its center position when not used.

7. The pointing device as recited in claim 1 or 2, wherein the cursor-moving switch comprises:

a flat base plate:

an operation button disposed on the upper surface of the base plate, the operation button having a shield disk horizontally movable;

optical devices to detect operation-direction for detecting interrupted signal of optical axis by the shield disk, the optical devices being symmetrically disposed at two orthogonal axes on the base plate; and an elastic member for keeping the center of the operation button at the crossing position of the two orthogonal axes, wherein the elastic member is made of a coil spring, its one end is fixed at the base plate, and the other end is engaged with the center of the operation button.

* * * * *